Feb. 10, 1970   B. J. ELZER   3,494,056
DISPLAY DEVICE
Filed Jan. 30, 1967
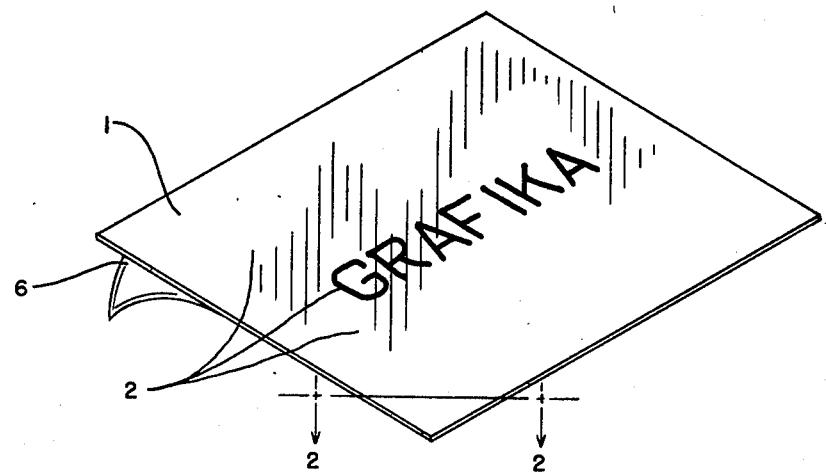
FIG. I
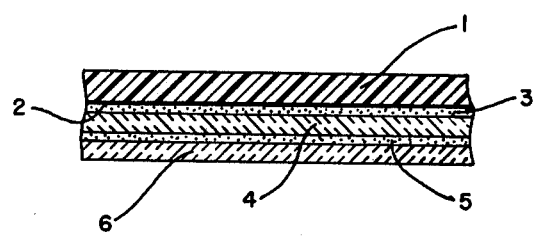
FIG. 2
INVENTOR
BERNARD J. ELZER
BY Richard O. Church
ATTORNEY

United States Patent Office 3,494,056
Patented Feb. 10, 1970

3,494,056
DISPLAY DEVICE
Bernard J. Elzer, 378 Sunset Road,
West Reading, Pa. 19602
Filed Jan. 30, 1967, Ser. No. 612,687
Int. Cl. A43c 3/00
U.S. Cl. 40—2                                      14 Claims

ABSTRACT OF THE DISCLOSURE

Printed plaques, name plates and the like, are protected in corrosive environments and from outdoor weathering by enclosing the printing within a sandwich comprised of a protective layer of taransparent plastic sheet on one side and a protective layer of a resin-impregnated backing paper on the other side.

---

This invention relates to printed plaques, indicia, name plates, and the like, that are used, for example, for advertising displays, for informative signs, and for attachment to manufactured goods. For convenience, these devices shall simply be referred to hereafter and in the appended claims as "plaques."

More particularly, this invention is concerned with methods and means for protecting plaques in corrosive environments and from outdoor weathering in order to preserve the clarity and legibility of the messages they bear.

THE PRIOR ART

In manufacturing plaques that may be exposed to the natural elements or corrosive environments, the desired legends are first printed upon a fibrous sheet or board, and then, to protect the printed sheet or broad, a clear plastic film, such as of acrylic or vinyl, is laminated over the face of the printed surface. This type of fabrication is satisfactory under conditions of mild abuse, but in applications where the plaque will be subjected to outdoor weathering or corrosive environments, ahe printed sheet or board may be degreded by penetration of corrosive vapors or moisture at the edges of the laminate. Even if the sheet or board itself is not degraded, the pigment or dyes included in the ink may be oxidized, with a resulting change in, or a total loss of, color.

By another method of manufacture now gaining commercial acceptance, no fibrous sheet or board is used, but rather the plaque is produced by application of the printing directly onto a clear sheet of plastic material, such as of an acrylic or vinyl. In these applications, a mirror image of the legend or design is printed on the reverse side of the sheet (hereinafter referred to as the "back" of the sheet) so that when the sheet is viewed from its unprinted side (the "front" of the sheet), the legend or design will appear correctly. This method is commonly referred to as "reverse printing."

While these plaques made from printed plastic sheets are susceptible to the destructive effect of surrounding environments, they have proved more satisfactory than the laminated variety discussed above. For one reason, the laminated plaques, by definition, must contain a fibrous sheet as a base material, and this fibrous material, in most instances, will readily absorb and retain moisture and corrosive vapors, thus subjecting both the base material and the inks to attack. The printed plastic plaques are not subject to this disability since they are generally chemically resistant and non-absorbent.

Although the printed plastic plaques may be somewhat superior to the laminated plaques, their life may also be limited by environmental conditions. Further, unless the plastic plaque is secured to a surface that provides an opaque background, the optimum qualities of clarity and birlliance of color will not be achieved and the plaque may appear somewhat "washed out." This difficulty is not encountered with the laminated plaque since the printing can be placed upon a paper or board that is opaque.

One difficulty that is common to both of the above types of plaques relates to providing effective means by which they can be mounted upon various surfaces for display. It has been common practice, by one method, to place an adhesive on the back surface of the plaque to enable adhering the plaque to the desired surface. Not only does the adhesive insure uniform contact between the back of the plaque and the mounting surface, but also the adhesive acts as a sealing agent at the edges of the plaque that tends to retard the peneration of moisture or corrosive vapors between he plaque and the mounting surface. While many adhesives may be used for this purpose, they have generally proved unsatisfactory for outdoor applications where fluctuations in temperature are encountered. It is believed that the difference in the coefficient of thermal expansion of the plaque from that of the mounting surface may develop stresses in the adhesive that may exceed the cohesive strength of the adhesive, and thus result is loss of adhesion. As is commonly known, the coefficient of thermal expansion of plastics is a full order of magnitude different from that of the coefficient of thermal expansion of most metals.

Accordingly, it is an object of this invention to provide plaques that are resistant to outdoor weathering conditions.

It is another object of this invention to provide plaques that will have comparatively long life even in corrosive environments.

Yet another object of this invention is to provide methods and means for manufacturing plaques that have improved properties of outdoor weathering and resistance to corrosive environments.

A further object of this invention is to provide methods and means for adhering plaques to various substrates in a manner such that the bonds will not be materially affected by fluctuations in temperature as may be encountered in outdoor conditions.

Quite generally, these and other objects of this invention are achieved by enclosing the printing within a protective sandwich comprised of transparent plastic sheet on one side and a resin-impregnated backing paper on the other side. By these means, the printing is fully protected from corrosive attack and, as will later become apparent, the plaque may be adhered to a surface by means of an adhesive and adhesion will not be lost, even when the ambient temperature varies widely.

The invention will be better understood in connection with the accompanying drawings in which:

FIG. 1 is a perspective view of a plaque constructed according to the teachings of this invention; and FIG. 2 is a section taken along line 2—2 of FIG. 1.

As illustrated in the drawings, the plaque of this invention is comprised of a transparent plastic film or sheet 1, onto the back side of which has been printed, by reverse printing, the legend "GRAFIKA." To make the legend stand out clearly, a second background color may then be printed over the entire surface of the back of the sheet. As shown in the drawings, both the legend and the background printing are designated by the numeral 2. While not necessary in the practice of this invention, it is convenient to print onto the plastic sheet 1 by means of the silk screen process.

A backing paper 4 that has been impregnated with a resistant adhesive is adhered to the back side of the printing 2 by means of the adhesive layer 3 on the one surface of backing paper 4. If desired, an adhesive layer 5 may be applied to the other surface of the backing paper 4 to enable convenient attachment of the plaque to a surface. If this is done, the adhesive layer must be protected during storage and handling by means of a suitable release paper 6.

THE PLASTIC SHEET

The plastic sheet or film 1 may be made of any common plastic that is transparent, that will accept an ink without affecting the pigments or dyes, and that is chemically resistant in the environment of intended use. Examples of such plastics that are readily available in the form of film or sheet are acrylics, vinyls, polyolefins, polyamides, and the like. While no critical to this invention, it is generally preferred to use plastic films of from about 5 to 15 mils in thickness, depending upon the specific nature of the application.

THE BACKING PAPER

Among the substances satisfactory for use as the backing paper may be mentioned cellulose materials such as tissue paper, rice tissue paper, a non-woven cotton sheet, and porous thermoplastic films such as acetate film, as well as other substances capable of absorbing and carrying an adhesive.

The thickness of the backing paper is an important consideration for several reasons. First, the backing paper should be sufficiently thick to be opaque. This will provide a background to insure that the printing on the plaque will appear bright and clear.

Second, the thickness of the backing paper is believed important to provide a resilient mass between the back of the printed plastic sheet and the substrate to which it is adhered. Due to the resiliency of this material, particularly when impregnated with an essentially elastomeric, pressure-sensitive material described below, comparatively wide changes in temperature can be accommodated without loss of adhesion even though the coefficient of thermal expansion of the sheet and the substrate to which it is adhered are substantially different.

As a generality, the backing paper should be from about 1 to 10 mils thick, and more preferably from about 2 to 6 mils thick.

In some instances, it may be desirable to add pigment to the backing and/or the material with which it is impregnated. When this is done, a base color will be provided so that a final background color need not be printed onto the plastic sheet and an entire printing operation can be eliminated. For example, common fillers such as titanium dioxide may be incorporated in the adhesive, and when the backing material is fully impregnated therewith, an opaque, matte, white surface will be produced that is ideally suited as a background color for many plaques of the type described in this application. As shown in FIG. 1, the legend "GRAFIKA" could be printed on the sheet 1, and if the backing paper 4 were pigmented, it would not be necessary to print a background over the back of the sheet 1 to make the legend stand out.

THE RELEASE PAPER

In the preferred embodiment of this invention, the adhesive material is allowed to penetrate thoroughly through and into the backing paper so that both surfaces of the backing paper will be coated with the adhesive. In use, one face of the adhesive-impregnated paper will be adhered to the back of the printing plastic sheet, while the opposite surface of the backing sheet will enable mounting the plaque against a substrate. Thus, until the plaque is to be mounted, it is necessary to protect this second adhesive surface in storage and handling by applying a release paper thereover. As is generally known in the art, suitable release papers provide a smooth, pinhole-free surface so that during storage of the plaques there will be no tendency for the pressure-sensitive adhesive to contact other surfaces and become adhered thereto. In addition, the release paper must be formulated so that no ingredient therein will be miscible or reactive with any ingredient in the adhesive coating; it must be of sufficiently high viscosity before coating to avoid saturating the backing paper; and it must be of such a nature that it will repel the pressure-sensitive adhesive surface so that the resultant backing can be easily removed even after long aging and exposure to ambient conditions of heat, humidity and pressure without any tendency of the release paper to delaminate. Many such release papers, such as silicone-impregnated kraft paper, are commonly available.

THE PRESSURE-SENSITIVE ADHESIVE

The words "pressure-sensitive" as used herein refer to adhesives that have a wide range of physical properties and the common characteristic of adhering to substrates by application of pressure alone. Also, these materials are generally more cohesive than adhesive.

Broadly stated, many pressure-sensitive adhesives are comprised of one or more elastomers, a resin, a softening agent, and any desired filler and curing agent. Generally, tht elastomeric composition is comprised of natural or synthetic rubber polymers and particularly synthetic polymers such as polyisobutylene and polyisoprene.

In order that the adhesive properties of the pressure-sensitive adhesive be preserved, it is important that the resin component be a non-reactive, permanently thermoplastic material that is compatible with the elastomers. Conveniently, long-chained petroleum hydrocarbon resins may be selected for this purpose.

The softening agent may be either a petroleum oil or a petroleum-based liquid polymer that is compatible with the elastomers and the resin to impart softness, flexibility and tackiness. A preferred material of the polymeric variety is comprised of polymer obtained by the catalytic polymerization of normal- and branch-chained polybutylenes having a molecular weight of about 500 to about 1500. A preferred oil softener is comprised of approximately 25% aromatic and 75% paraffinic and naphthenic hydrocarbons having an API gravity of 20° to 30° and a viscosity of 70 to 475 Saybolt seconds Universal at 100° F.

Although certain embodiments of this invention have been shown in the drawing and described in the specification, it is to be understood that the invention is not limited thereto, is capable of modification, and can be rearranged without departing from the spirit and scope of the invention.

I claim:

1. A plaque of the character described bearing a printed display or legend comprised of:
    a transparent sheet comprised of a synthetic resinous material;
    printing on one surface of said sheet; and
    a protective coating over said printing which is comprised of a resin-impregnated backing paper.

2. A plaque according to claim 1 in which said backing paper is essentially cellulose.

3. A plaque according to claim 1 in which said resin-impregnated backing paper is resistant to corrosion.

4. A plaque according to claim 1 in which said backing paper is from about 1 to about 10 mils thick.

5. A plaque according to claim 4 in which said backing paper is from about 2 to about 6 mils thick.

6. A plaque according to claim 1 in which said backing paper is opaque.

7. A plaque according to claim 6 in which said backing paper is colored.

8. A plaque according to claim 1 in which said backing paper is impregnated with a pressure-sensitive adhesive material.

9. A plaque according to claim 8 in which said pressure-sensitive adhesive material is comprised of elastomers and non-reactive, permanently thermoplastic resins.

10. A plaque according to claim 9 in which said pressure-sensitive material includes a softening agent and a curing agent.

11. A plaque according to claim 8 in which said pressure-sensitive adhesive is present on both surfaces of said backing paper.

12. A plaque according to claim 11 in which release paper is placed over the exposed surface of said backing paper.

13. A method for manufacturing a printed adhesive plaque that is resistant to corrosive attack comprising the steps of:

reverse printing a legend on the back side of a transparent sheet; and adhering a resin-impregnated backing paper over the reverse printing, which backing paper is impregnated with a pressure-sensitive, corrosion-resisting adhesive.

14. A method according to claim 13 in which the backing paper is from about 1 to about 10 mils thick and is covered with a release paper on the side opposite from that adhered to the reverse printing.

References Cited

UNITED STATES PATENTS

| | | |
|---|---|---|
| 2,561,894 | 7/1951 | Wallich. |
| 2,953,865 | 9/1960 | Heuser _____ 40—2 |
| 3,069,793 | 12/1962 | Francescon _____ 40—2.2 |
| 3,152,901 | 10/1966 | Johnson _____ 40—2.2 X |

EUGENE R. CAPOZIO, Primary Examiner

W. J. CONTRERAS, Assistant Examiner